(12) United States Patent
Takenaka et al.

(10) Patent No.: US 12,441,426 B2
(45) Date of Patent: Oct. 14, 2025

(54) FUEL TANK

(71) Applicant: HONDA MOTOR CO., LTD., Tokyo (JP)

(72) Inventors: Hiroshi Takenaka, Tokyo (JP); Daisuke Yamaguchi, Tokyo (JP); Yasuo Shinde, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 478 days.

(21) Appl. No.: 18/044,870

(22) PCT Filed: Jun. 10, 2021

(86) PCT No.: PCT/JP2021/022179
§ 371 (c)(1),
(2) Date: Mar. 10, 2023

(87) PCT Pub. No.: WO2022/059275
PCT Pub. Date: Mar. 24, 2022

(65) Prior Publication Data
US 2024/0017785 A1 Jan. 18, 2024

(30) Foreign Application Priority Data
Sep. 18, 2020 (JP) .................. 2020-157823

(51) Int. Cl.
*B62J 35/00* (2006.01)
(52) U.S. Cl.
CPC .................... *B62J 35/00* (2013.01)
(58) Field of Classification Search
CPC ....................................... B62J 35/00
USPC ........................................................ 280/833
See application file for complete search history.

(56) References Cited

U.S. PATENT DOCUMENTS

| 6,213,514 B1 | 4/2001 | Natsume et al. |
| 2002/0096522 A1 | 7/2002 | Palvoelgyi et al. |

FOREIGN PATENT DOCUMENTS

| JP | S55-6175 U | 1/1980 | |
| JP | S55-6176 U | 1/1980 | |
| JP | S56-13220 A | 2/1981 | |
| JP | S60-61984 U | 4/1985 | |
| JP | S62-99285 A | 5/1987 | |
| JP | H09-39864 A | 2/1997 | |
| JP | 10-181654 A | 7/1998 | |
| JP | 4495808 B2 * | 7/2010 | ............. F16L 21/00 |
| JP | 2016-068715 A | 5/2016 | |

OTHER PUBLICATIONS

International Search Report, International Application No. PCT/JP2021/022179, Date of mailing: Aug. 3, 2021, 3 pages.
(Continued)

*Primary Examiner* — Valentin Neacsu
*Assistant Examiner* — Felicia L. Brittman-Alabi
(74) *Attorney, Agent, or Firm* — Rankin, Hill & Clark LLP

(57) ABSTRACT

A fuel tank includes: a fuel tank main body that stores fuel; and an oil filler port, in which an opening that penetrates the fuel tank main body is provided, a plate member that closes the opening is welded to the fuel tank main body, a strength of the plate member is higher than a strength of the fuel tank main body, and the oil filler port is provided in the plate member.

20 Claims, 6 Drawing Sheets

(56) References Cited

OTHER PUBLICATIONS

International Preliminary Examination Report, PCT/IPEA/409, International Application No. PCT/JP2021/022179, Dated Jun. 14, 2022, 9 pages.

English translation of the International Preliminary Report on Patentability dated Mar. 23, 2023 issued in corresponding International application No. PCT/JP2021/022179 (4 pages).

* cited by examiner

FUEL TANK

TECHNICAL FIELD

The present invention relates to a fuel tank.

BACKGROUND ART

Conventionally, in a fuel tank, there is known a structure in which a ferrule forming an oil filler port is inserted into an opening of the fuel tank, and an outer periphery of the ferrule is welded to the opening of the fuel tank (see, for example, Patent Literature 1).

CITATION LIST

Patent Literature

Patent Literature 1: JP H9-39864 A

SUMMARY OF INVENTION

Technical Problem

Incidentally, in the fuel tank, it is desired to increase the strength of the portion around the oil filler port.

The present invention has been made in view of the above-described circumstances, and an object is to increase strength of the portion around the oil filler port of the fuel tank with a simple configuration.

Solution to Problem

The present description includes all the contents of Japanese Patent Application No. 2020-157823 filed on Sep. 18, 2020.

A fuel tank is a fuel tank including a fuel tank main body that stores fuel and an oil filler port, in which an opening that penetrates the fuel tank main body is provided, a plate member that closes the opening is welded to the fuel tank main body, a strength of the plate member is higher than a strength of the fuel tank main body, and the oil filler port is provided in the plate member.

Furthermore, in the above-described configuration, the plate thickness of the plate member may be larger than the plate thickness of the fuel tank main body.

Furthermore, in the above-described configuration, the plate member may be provided to overlap a peripheral edge portion of the opening, and an overlapping surface which is a surface of a surface of the plate member on a side overlapping the peripheral edge portion, and the peripheral edge portion may be welded by a weld portion along an inner peripheral surface of the peripheral edge portion.

Furthermore, in the above-described configuration, the plate member may overlap the peripheral edge portion from inside the fuel tank main body.

Moreover, in the above-described configuration, a fuel cap fastening portion may be provided on the plate member, and a fuel cap that openably closes the oil filler port may be fastened to the fuel cap fastening portion.

Furthermore, in the above-described configuration, the fuel tank may be mounted on a saddle-ride vehicle, the saddle-ride vehicle may include a side stand that supports the saddle-ride vehicle in a state of being inclined to one of left and right, a fuel cap that openably closes the oil filler port may be provided, the fuel cap may include a cap main body that closes the oil filler port and a frame portion that supports the cap main body in an openable and closable manner, the frame portion may include an annular portion that surrounds the cap main body from a periphery, and a protrusion portion that protrudes downward from the annular portion, the protrusion portion may include a recessed portion in which liquid is accumulated, and a discharge port that discharges the liquid may be provided on a side surface of a side surface of the recessed portion on a lower side in a state where the saddle-ride vehicle is supported by the side stand.

Advantageous Effects of Invention

The fuel tank includes the fuel tank main body that stores fuel and the oil filler port, in which the opening that penetrates the fuel tank main body is provided, the plate member that closes the opening is welded to the fuel tank main body, the strength of the plate member is higher than the strength of the fuel tank main body, and the oil filler port is provided in the plate member.

With this configuration, since the plate member closes the opening by being welded to the opening of the fuel tank main body, the plate member having higher strength than the fuel tank main body can be easily provided in the fuel tank. Then, the oil filler port is provided in the plate member. Thus, the strength of the portion around the oil filler port can be increased with a simple configuration.

Furthermore, in the above-described configuration, the plate thickness of the plate member may be larger than the plate thickness of the fuel tank main body.

With this configuration, the strength of the plate member can be increased with a simple configuration. Furthermore, since the plate thickness of the fuel tank main body can be reduced, the fuel tank can be reduced in weight.

Furthermore, in the above-described configuration, the plate member may be provided to overlap the peripheral edge portion of the opening, and the overlapping surface which is a surface of a surface of the plate member on a side overlapping the peripheral edge portion, and the peripheral edge portion may be welded by a weld portion along the inner peripheral surface of the peripheral edge portion.

With this configuration, since the peripheral edge portion of the opening is welded to the overlapping surface of the plate member having a large plate thickness, the depth of welding to the plate member can be increased, and welding can be performed favorably.

Furthermore, in the above-described configuration, the plate member may overlap the peripheral edge portion from inside the fuel tank main body.

With this configuration, the plate member can be prevented from projecting to the outside of the fuel tank main body, the fuel tank can be made compact, and the appearance of the fuel tank is good. Furthermore, the plate member and the fuel tank main body can be welded from the outside of the fuel tank, and welding workability is good.

Moreover, in the above-described configuration, the fuel cap fastening portion may be provided on the plate member, and the fuel cap that openably closes the oil filler port may be fastened to the fuel cap fastening portion.

With this configuration, since the fuel cap is fastened to the plate member having a large plate thickness via the fuel cap fastening portion, the fuel cap can be firmly fixed. Thus, the oil filler port can be favorably closed with the fuel cap.

Furthermore, in the above-described configuration, the fuel tank may be mounted on a saddle-ride vehicle, the saddle-ride vehicle may include the side stand that supports the saddle-ride vehicle in a state of being inclined to one of left and right, the fuel cap that openably closes the oil filler port may be provided, the fuel cap may include the cap main body that closes the oil filler port and the frame portion that supports the cap main body in an openable and closable manner, the frame portion may include the annular portion that surrounds the cap main body from the periphery, and the protrusion portion that protrudes downward from the annular portion, the protrusion portion may include the recessed portion in which liquid is accumulated, and the discharge port that discharges the liquid may be provided on a side surface of a side surface of the recessed portion on a lower side in a state where the saddle-ride vehicle is supported by the side stand.

With this configuration, in a state where the saddle-ride vehicle is supported by the side stand, the liquid accumulated in the recessed portion of the frame portion of the fuel cap can be discharged through the discharge port by the inclination of the saddle-ride vehicle.

BRIEF DESCRIPTION OF DRAWINGS

FIG. 3 is a cross-sectional view of a front portion of the motorcycle taken along a center in a vehicle width direction, and illustrates cross sections of a vehicle body frame, a fuel tank, and the like.

DESCRIPTION OF EMBODIMENTS

Figure 1:
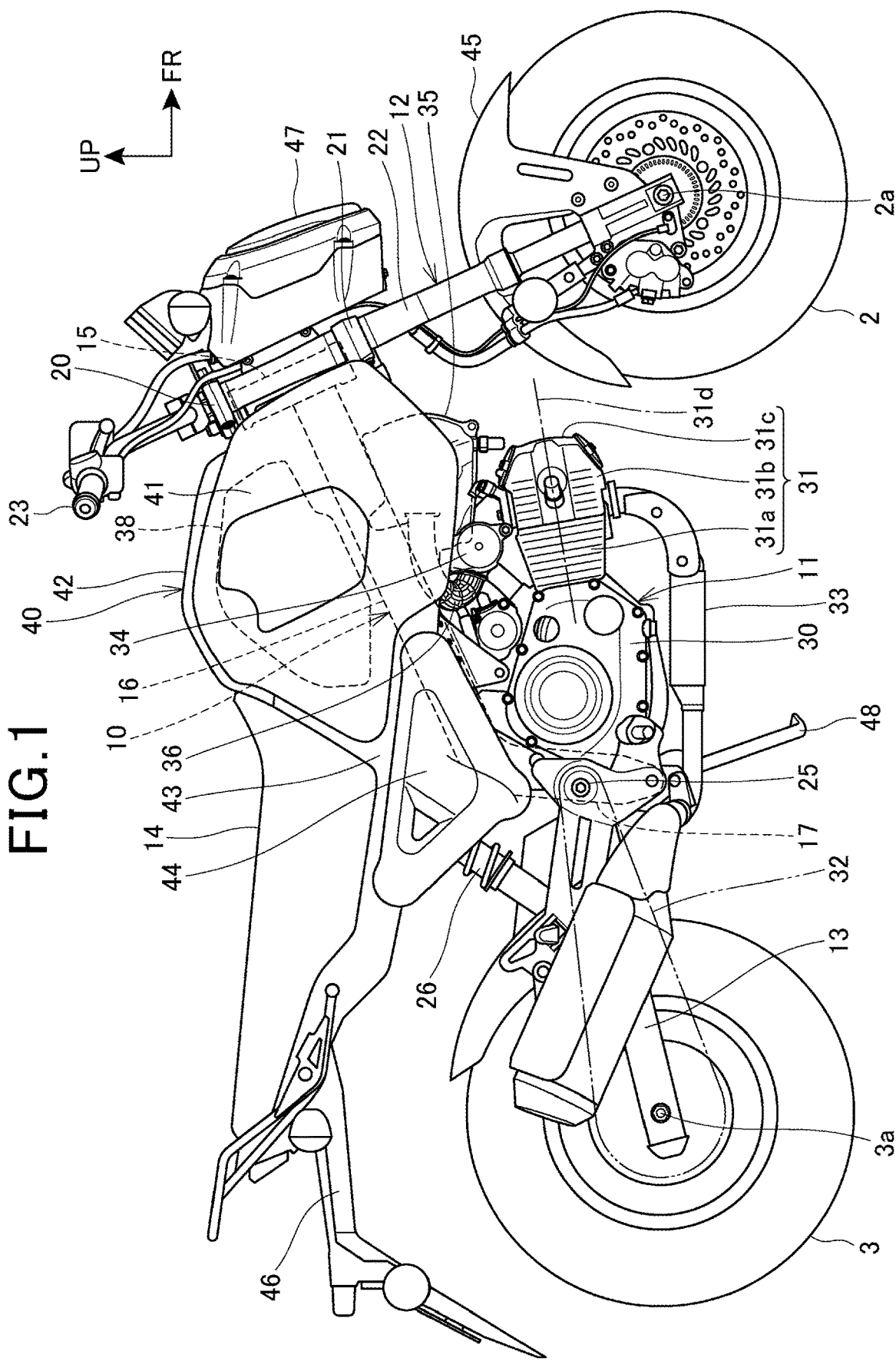
FIG. 1 is a right side view of a motorcycle according to an embodiment of the present invention.

An embodiment of the present invention will be described below with reference to the drawings. Note that in the description, directions such as front, rear, left, right, up, and down are the same as the directions of a vehicle body, unless otherwise specified. Furthermore, in the drawings, reference sign FR denotes the front side of the vehicle body, reference sign UP denotes the upper side of the vehicle body, and reference sign RH denotes the right side of the vehicle body.

FIG. 1 is a right side view of a motorcycle 1 according to an embodiment of the present invention.

The motorcycle 1 is a vehicle including a vehicle body frame 10, an engine 11 supported by the vehicle body frame 10, a front fork 12 supporting a front wheel 2 in a steerable manner, a swing arm 13 supporting a rear wheel 3, and a seat 14 for a passenger.

The motorcycle 1 is a saddle-ride vehicle on which the passenger sits astride the seat 14. The seat 14 is provided above a rear portion of the vehicle body frame 10.

The vehicle body frame 10 includes a head pipe 15 provided at a front end of the vehicle body frame 10, a main frame 16 extending rearward and downward from the head pipe 15, and a pivot frame 17 extending downward from a rear end portion of the main frame 16.

Furthermore, the vehicle body frame 10 includes a seat frame (not illustrated) that constitutes the rear portion of the vehicle body frame 10 behind the main frame 16.

The main frame 16 is a pipe member extending rearward and downward at the center in the vehicle width direction from the head pipe 15. Similarly to the head pipe 15, the main frame 16 is a single frame member disposed at the center in the vehicle width direction.

The pivot frame 17 is a single member extending downward at the center in the vehicle width direction from the rear end portion of the main frame 16.

The front fork 12 includes a steering shaft (not illustrated) rotatably supported by the head pipe 15, a top bridge 20 fixed to an upper end of the aforementioned steering shaft, a bottom bridge 21 fixed to a lower end of the aforementioned steering shaft, a pair of left and right fork tubes 22 supported by the top bridge 20 and the bottom bridge 21. The fork tube 22 is a telescopic suspension.

The front wheel 2 is supported by an axle 2a passed between lower end portions of the left and right fork tubes 22.

A handlebar 23 for the passenger to steer the front fork 12 to the left and right is attached to an upper end portion of the front fork 12.

The swing arm 13 is supported by a pivot shaft 25 supported by the pivot frame 17. The pivot shaft 25 is a shaft extending horizontally in the vehicle width direction. The swing arm 13 has a front end portion through which the pivot shaft 25 is inserted. The swing arm 13 swings upward and downward about the pivot shaft 25.

The rear wheel 3 is supported by an axle 3a provided at a rear end portion of the swing arm 13.

A rear cushion 26 is disposed between a rear portion of the swing arm 13 and the rear portion of the vehicle body frame 10.

The engine 11 is disposed below the main frame 16 and ahead of the pivot frame 17. The engine 11 is fastened to the main frame 16 and the pivot frame 17.

The engine 11 is an internal combustion engine including a crankcase 30 housing a crankshaft (not illustrated) extending in the vehicle width direction, and a cylinder portion 31 extending forward from a front surface portion of the crankcase 30.

The cylinder portion 31 includes a cylinder 31a housing a piston (not illustrated), a cylinder head 31b extending forward from the cylinder 31a, and a head cover 31c covering the cylinder head 31b from the front.

The engine 11 is a horizontal engine with a cylinder axis 31d of the cylinder 31a extending forward substantially horizontally in vehicle side view. The aforementioned piston reciprocates back and forth along the cylinder axis 31d.

Output of the engine 11 is transmitted to the rear wheel 3 through a driving-force transmission member 32 connecting an output shaft (not illustrated) provided at a rear portion of the engine 11 and the rear wheel 3.

An exhaust device 33 of the engine 11 extends toward the rear of the vehicle from an exhaust port in a lower surface of the cylinder head 31b.

A throttle body 34 that adjusts the amount of intake air of the engine 11 is disposed above the cylinder portion 31. The throttle body 34 is connected to an intake port on an upper surface of the cylinder head 31b.

An air cleaner box 35 that takes in outside air as intake air for the engine 11 is disposed between the cylinder portion 31 and the main frame 16 in an up-down direction ahead of the crankcase 30 and behind the head pipe 15. The air cleaner box 35 is positioned below the main frame 16 and overlaps the cylinder portion 31 from above. The air cleaner box 35 is positioned ahead of and above the throttle body 34.

The air cleaner box 35 is connected to the throttle body 34 by a connection pipe 36 extending rearward from a rear portion of the air cleaner box 35.

A fuel tank 38 is disposed above the main frame 16 between the head pipe 15 and the seat 14. The fuel tank 38 is fixed to the vehicle body frame 10.

The fuel in the fuel tank 38 is supplied to the aforementioned intake port by a fuel supply device (not illustrated) provided in an intake passage.

The motorcycle 1 includes a vehicle body cover 40 covering the vehicle body.

The vehicle body cover 40 includes a pair of left and right tank covers 41 covering the fuel tank 38 from lateral sides, and an upper surface cover 42 covering the fuel tank 38 from above.

Furthermore, the vehicle body cover 40 includes a side cover 43 covering, from a lateral side, the vehicle body below the seat 14, and a cover 44 covering, from a lateral side, the pivot frame 17 and the like below the side cover 43.

The motorcycle 1 includes a front fender 45 covering the front wheel 2 from above and a rear fender 46 covering the rear wheel 3 from above.

A headlight 47 is disposed ahead of the head pipe 15.

The motorcycle 1 includes a side stand 48 that supports the motorcycle 1 in contact with a road surface during parking. The side stand 48 is provided on the left side of a lower portion of the pivot frame 17, and is disposed offset to the left side with respect to the center in the vehicle width direction.

In a state where the motorcycle 1 is parked by the side stand 48, the motorcycle 1 is inclined to the left.

Figure 2:
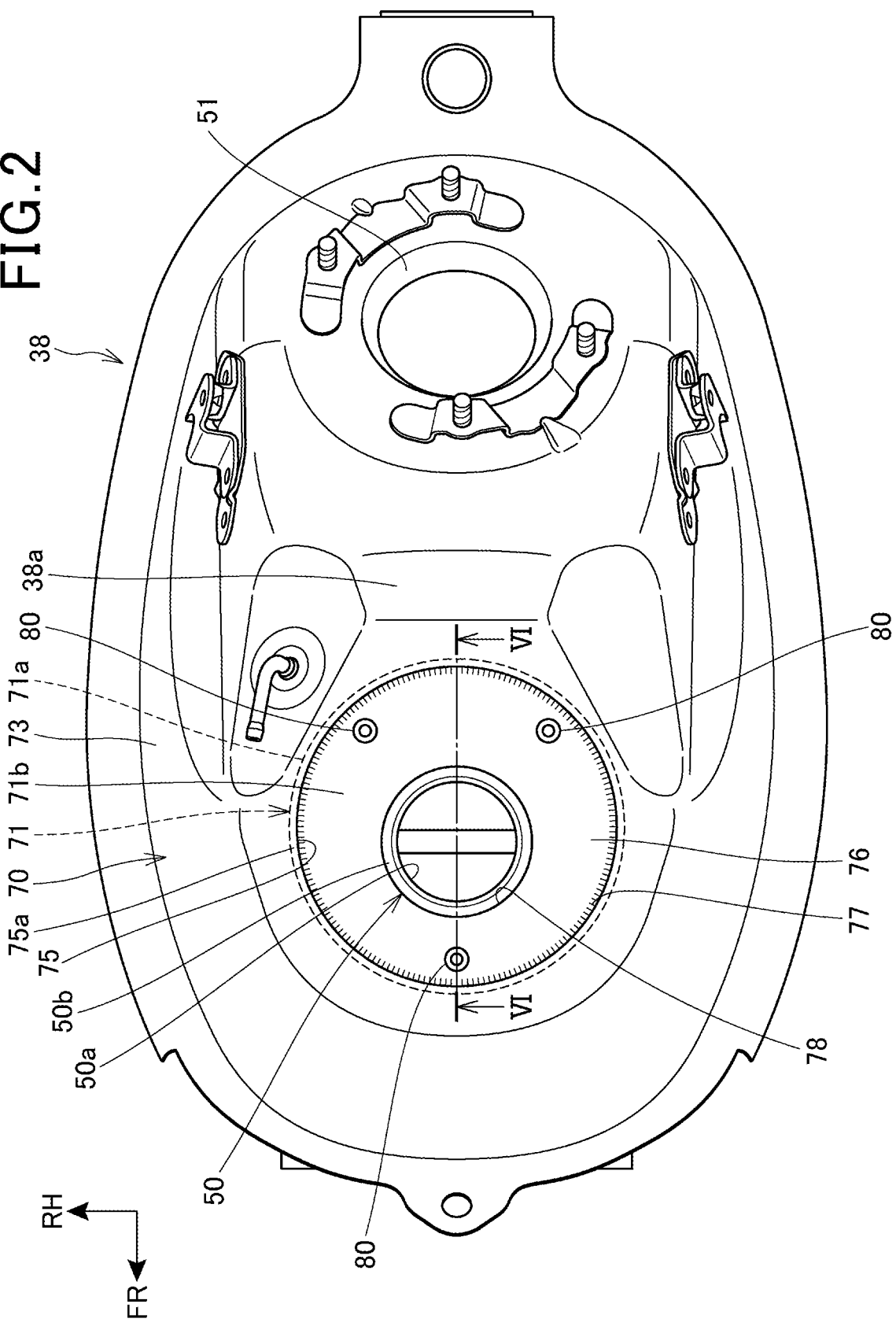
FIG. 2 is a plan view of a fuel tank, when viewed from above.
Figure 3:
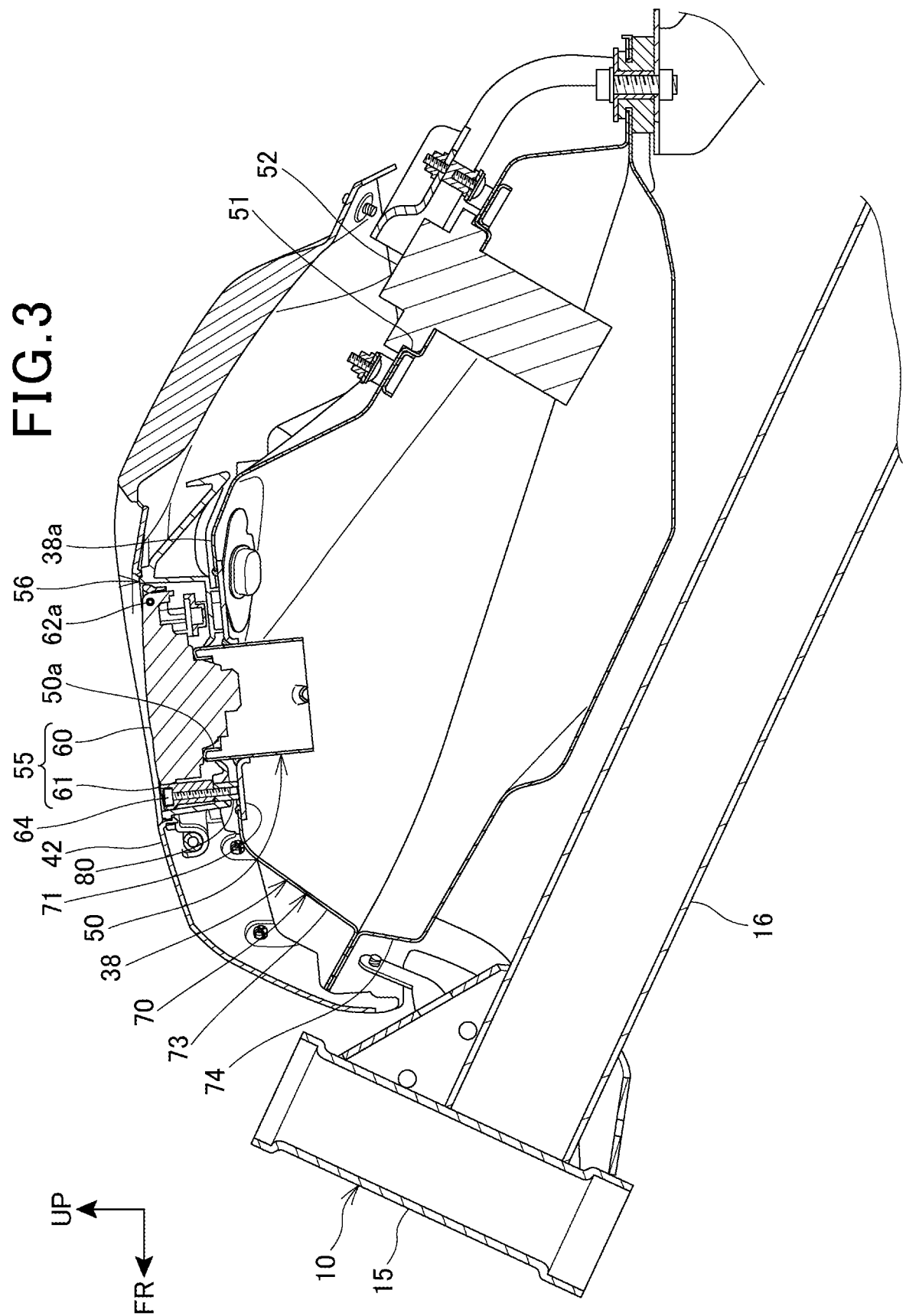

FIG. 2 is a plan view of the fuel tank 38, when viewed from above. FIG. 3 is a cross-sectional view of a front portion of the motorcycle 1 taken along a center in a vehicle width direction, and illustrates cross sections of the vehicle body frame 10, the fuel tank 38, and the like.

A ferrule 50 having a cylindrical shape extending upward with respect to an upper surface 38a is provided on the upper surface 38a of the fuel tank 38. The ferrule 50 is a cylindrical member that allows the interior of the fuel tank 38 to communicate with the exterior.

The opening defined by an inner peripheral portion of the ferrule 50 is an oil filler port 50a. The fuel is injected into the fuel tank 38 through the oil filler port 50a. The oil filler port 50a is located at the center in the vehicle width direction.

The oil filler port 50a is provided at a front portion of the upper surface 38a. A fuel pump attachment portion 51 is provided behind the oil filler port 50a on the upper surface 38a of the fuel tank 38. A fuel pump 52 that sends the fuel in the fuel tank 38 to the engine 11 is inserted into the opening of the fuel pump attachment portion 51 and fastened to the fuel pump attachment portion 51.

Figure 4:
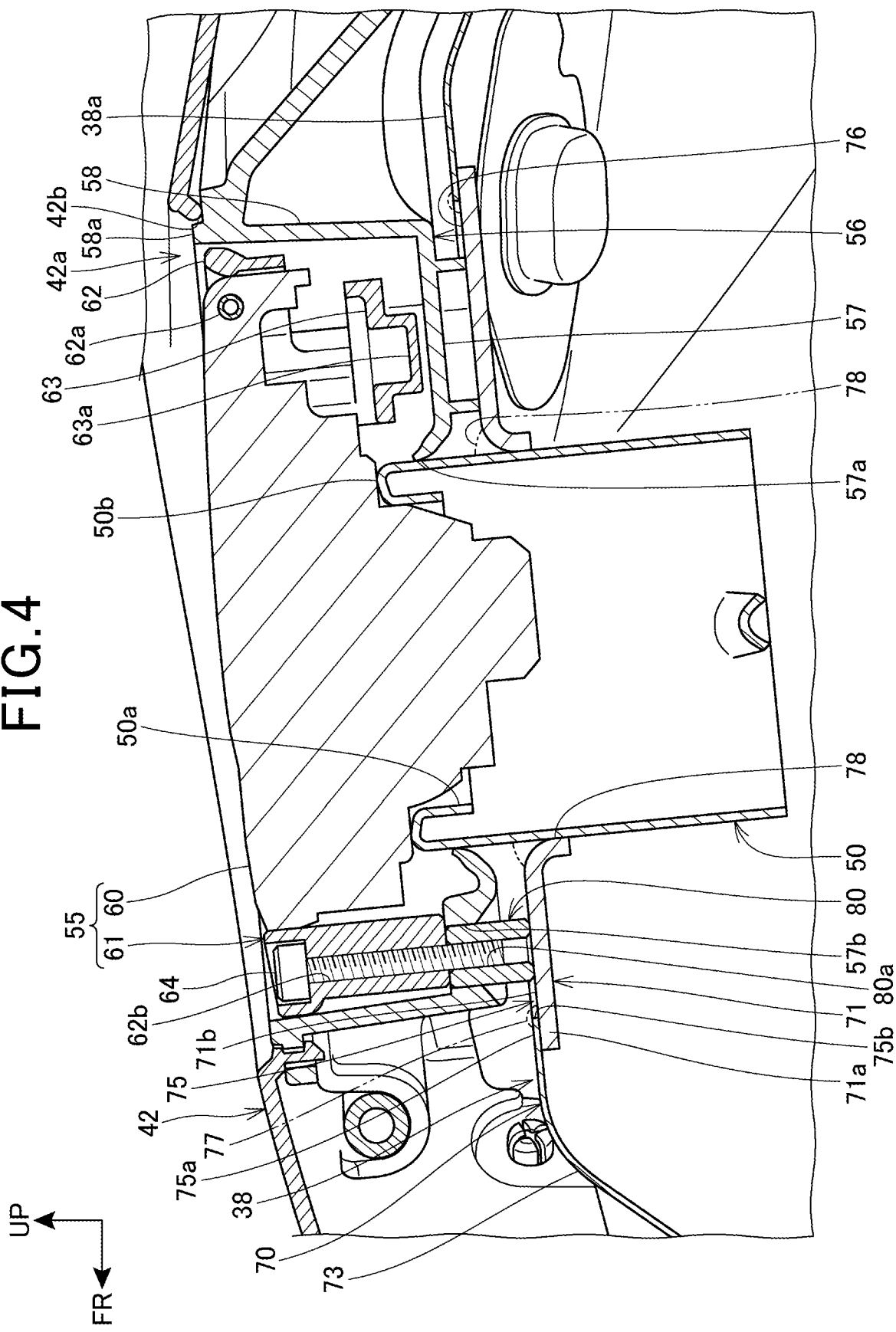
FIG. 4 is an enlarged cross-sectional view of an oil filler port in FIG. 3.

FIG. 4 is an enlarged cross-sectional view of the oil filler port 50a in FIG. 3.

Referring to FIGS. 2 to 4, a fuel cap 55 that openably closes the oil filler port 50a is attached to the fuel tank 38.

Furthermore, a fuel receiving member 56 having a tray shape surrounding the ferrule 50 from the periphery is provided on the upper surface 38a of the fuel tank 38.

Figure 5:
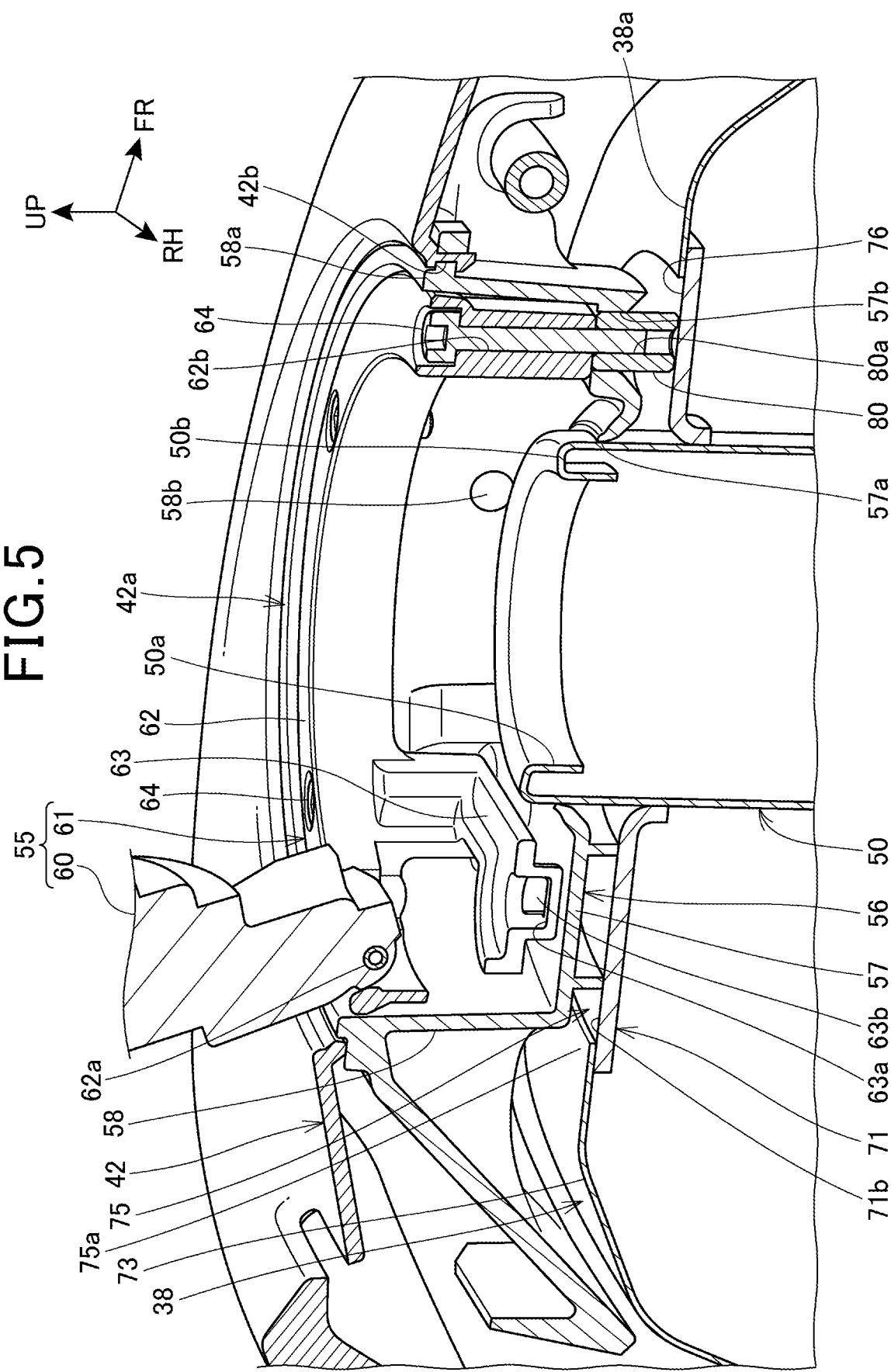
FIG. 5 is a perspective view of a cross section of FIG. 4.

FIG. 5 is a perspective view of a cross section of FIG. 4. FIG. 5 illustrates the fuel cap 55 in an open state.

The fuel receiving member 56 includes a bottom wall portion 57 disposed around the ferrule 50 and a peripheral wall portion 58 extending upward from the bottom wall portion 57.

The bottom wall portion 57 is a substantially circular plate in top view, and includes an opening 57a at a central portion. The fuel receiving member 56 is placed on the upper surface 38a of the fuel tank 38 in a state where the opening 57a is fitted to the outer periphery of the ferrule 50.

The bottom wall portion 57 includes, around the opening 57a, an attachment hole 57b penetrating the bottom wall portion 57 upward and downward.

The peripheral wall portion 58 extends upward from a peripheral edge portion of the bottom wall portion 57. The peripheral wall portion 58 is a wall having an annular shape surrounding the ferrule 50 from the periphery in top view.

An upper end 58a of the peripheral wall portion 58 is positioned above an upper end 50b of the ferrule 50.

A drain hole 58b (FIG. 5) is provided in a lower portion of the peripheral wall portion 58. The drain hole 58b is provided on a left side surface of the peripheral wall portion 58 and is offset to the left with respect to the center in the vehicle width direction.

The drain hole 58b allows the inside of the fuel receiving member 56 to communicate with the outside.

A drain hose (not illustrated) is connected to the drain hole 58b from the outside of the peripheral wall portion 58.

The fuel receiving member 56 receives liquid entering the periphery of the oil filler port 50a, and discharges the liquid to the outside through the drain hole 58b and the aforementioned drain hose. The aforementioned liquid is, for example, fuel spilled around the oil filler port 50a at the time of oil filling, and water that has entered the fuel receiving member 56 at the time of car washing.

When the motorcycle 1 is parked while being supported by the side stand 48, the fuel receiving member 56 is inclined integrally with the vehicle body, and the left side portion is lowered. Thus, the liquid received by the fuel receiving member 56 can efficiently flow into the drain hole 58b.

The upper surface 38a of the fuel tank 38 is covered with the upper surface cover 42 from above. The upper surface cover 42 includes a cover opening 42a that exposes the fuel receiving member 56 and the fuel cap 55 upward.

A peripheral edge portion 42b of the cover opening 42a is connected to an outer peripheral portion of the upper end 58a of the peripheral wall portion 58 of the fuel receiving member 56.

The fuel cap 55 includes a cap main body 60 that closes the oil filler port 50a, and a frame portion 61 that supports the cap main body 60 in an openable and closable manner.

The cap main body 60 is a lid having a substantially circular shape in plan view, and covers the oil filler port 50a from above.

The frame portion 61 includes an annular portion 62 surrounding the cap main body 60 from the periphery, and a protrusion portion 63 protruding downward from the annular portion 62 toward the bottom wall portion 57 of the fuel receiving member 56.

The fuel cap 55 is housed in the fuel receiving member 56. An outer periphery of the annular portion 62 is fitted to an inner periphery of the peripheral wall portion 58 of the fuel receiving member 56.

A hinge 62a that supports the cap main body 60 is provided at a rear end portion of the annular portion 62. The hinge 62a is a shaft extending in the vehicle width direction. The cap main body 60 rotates upward and downward about the hinge 62a to open and close the oil filler port 50a.

The annular portion 62 is provided, in a circumferential direction, with a plurality of fixing holes 62b penetrating the annular portion 62 upward and downward.

The fuel cap 55 is fixed to the fuel tank 38 by fuel cap fixtures 64 inserted into the fixing holes 62b of the annular portion 62 from above.

The protrusion portion 63 prevents the fuel cap 55 from being erroneously attached to another fuel tank. For example, when the fuel cap 55 is to be attached to a fuel tank of a motorcycle having specifications different from those of the motorcycle 1, the protrusion portion 63 contacts a bottom wall portion of a fuel receiving member of the aforementioned motorcycle having the different specifications, and the fuel cap 55 cannot be attached. Thus, the fuel cap 55 is prevented from being erroneously attached to another fuel tank.

On the other hand, in the motorcycle 1, the protrusion portion 63 does not contact the bottom wall portion 57 of the fuel receiving member 56. Thus, the fuel cap 55 can be attached to the fuel tank 38.

The protrusion portion 63 is positioned below the cap main body 60. The protrusion portion 63 includes a recessed portion 63a recessed downward. The aforementioned liquid flowing from above is accumulated in the recessed portion 63a. The protrusion portion 63 is lightened by the recessed portion 63a. Thus, the fuel cap 55 can be made lightweight.

A discharge port 63b for discharging the liquid in the recessed portion 63a is provided on a left side surface of the recessed portion 63a. The left side surface of the recessed portion 63a is a side surface, of side surfaces of the recessed portion 63a, on a lower side in a state where the motorcycle 1 is supported by the side stand. The liquid discharged through the discharge port 63b passes through the fuel receiving member 56 and is discharged to the outside through the drain hole 58b.

Referring to FIGS. 2 and 3, the fuel tank 38 includes a hollow fuel tank main body 70, a plate member 71 welded to the fuel tank main body 70, and the ferrule 50. The fuel tank main body 70, the plate member 71, and the ferrule 50 are made of metal.

The fuel tank main body 70 is divided into an upper half body 73 constituting an upper portion of the fuel tank main body 70 and a lower half body 74 constituting a lower portion of the fuel tank main body.

The upper half body 73 has a case shape having a lower surface opened downward. The lower half body 74 has a case shape having an upper surface opened upward. The upper half body 73 and the lower half body 74 are formed in a case shape by shaping a plate material by press working or the like.

The fuel tank main body 70 is formed in a tank shape by joining a lower surface portion of the upper half body 73 and an upper surface portion of the lower half body 74 by welding.

An opening 75 penetrating the fuel tank main body 70 in a plate thickness direction is provided in an upper surface of the fuel tank main body 70. The opening 75 is provided in a front portion of an upper surface of the upper half body 73.

The opening 75 is circular in top view.

The plate member 71 is welded to a peripheral edge portion 75a of the opening 75 to close the opening 75. The ferrule 50 is provided on the plate member 71.

Figure 6:
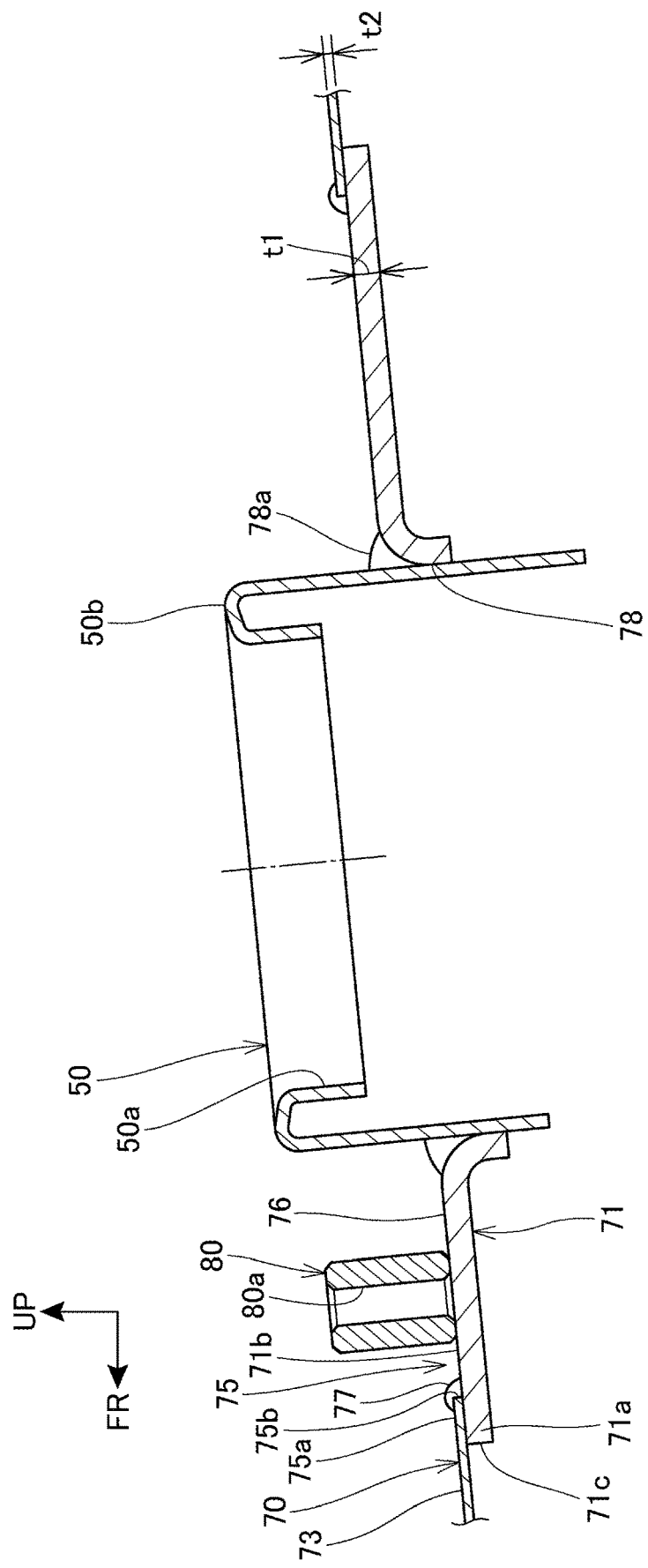
FIG. 6 is a cross-sectional view taken along line VI-VI of FIG. 2.

FIG. 6 is a cross-sectional view taken along line VI-VI of FIG. 2.

Referring to FIGS. 2 and 6, the plate member 71 is a disk having a diameter larger than that of the opening 75 in top view.

The plate member 71 and the fuel tank main body 70 are made of the same material. A plate thickness t1 of the plate member 71 is larger than a plate thickness t2 of the fuel tank main body 70. In the present embodiment, the plate thickness t1 is twice or more the plate thickness t2. Thus, the strength of the plate member 71 is higher than the strength of the fuel tank main body 70.

Note that the strength of the plate member 71 may be made higher than the strength of the fuel tank main body 70 by using a material having higher strength than a material constituting the fuel tank main body 70 as the material constituting the plate member 71.

In the plate member 71, a peripheral edge portion 71a on an outer peripheral side of the plate member 71 is provided to overlap the peripheral edge portion 75a of the opening 75 in the plate thickness direction. In top view, the plate member 71 is disposed such that the center of the plate member 71 and the center of the opening 75 substantially coincide with each other.

Among surfaces of the plate member 71, a surface on a side overlapping the peripheral edge portion 75a of the opening 75 in the plate thickness direction is an overlapping surface 71b.

The plate member 71 overlaps the peripheral edge portion 75a of the opening 75 from inside the fuel tank main body 70 and from below. Thus, the overlapping surface 71b is an upper surface of the plate member 71.

In the portion of the opening 75, the plate member 71 is positioned below the peripheral edge portion 75a by the plate thickness of the fuel tank main body 70. Thus, a stepped portion 76 in which the plate member 71 is lower than the peripheral edge portion 75a is formed inside the opening 75.

Between the plate member 71 and the fuel tank main body 70, the overlapping surface 71b of the plate member 71 and the peripheral edge portion 75a of the opening 75 are welded by a weld portion 77 along an inner peripheral surface 75b of the peripheral edge portion 75a.

The weld portion 77 is a weld bead having an annular shape that goes around the overlapping surface 71b, which is the upper surface of the plate member 71, along the inner peripheral surface 75b.

As described above, since the weld portion 77 is welded to the upper surface of the plate member 71 having a large plate thickness, the weld depth of the weld portion 77 to the plate member 71 can be increased, and welding can be performed favorably.

For example, when an outer peripheral surface 71c of the peripheral edge portion 71a of the plate member 71 and a lower surface of the peripheral edge portion 75a of the opening 75 are welded, the weld portion is formed on a lower surface of the fuel tank main body 70 having a small plate thickness, so that the weld portion easily penetrates the fuel tank main body 70 in the plate thickness direction, and welding becomes difficult.

The ferrule 50 is provided at a central portion of the plate member 71 in top view.

In detail, the ferrule 50 is positioned at the center of the plate member 71 having a circular shape in the vehicle width direction.

The ferrule 50 is disposed offset toward a front side with respect to the center of the plate member 71 in a front-rear direction. Thus, the distance between a front end of the ferrule 50 and the peripheral edge portion 75a of the opening 75 is smaller than the distance between a rear end of the ferrule 50 and the peripheral edge portion 75a of the opening 75. That is, in top view, the area of the plate member 71 excluding the portion of the ferrule 50 is larger at the rear portion than at the front portion of the plate member 71.

The plate member 71 includes a ferrule support hole portion 78 penetrating the plate member 71. The ferrule support hole portion 78 has a cylindrical shape extending inward of the fuel tank main body 70 with respect to the upper surface of the plate member 71.

The ferrule 50 is fitted to an inner periphery of the ferrule support hole portion 78. The ferrule 50 is welded to a peripheral edge portion of the ferrule support hole portion 78 by a weld bead 78a along an outer periphery of the ferrule 50.

A fuel cap fastening portion 80 to which the fuel cap 55 is fastened is provided on the upper surface of the plate member 71. A plurality of fuel cap fastening portions 80 is disposed around the ferrule 50 on the upper surface of the plate member 71.

In detail, one fuel cap fastening portion 80 is provided ahead of the ferrule 50 at the center of the plate member 71 in a width direction.

Furthermore, a pair of fuel cap fastening portions 80 is provided on the left and right with respect to the center of the plate member 71 in the width direction behind the ferrule 50.

The fuel cap fastening portion 80 is a nut in which a female screw portion 80a is provided on an inner periphery of a cylindrical member extending upward and downward. The fuel cap fastening portion 80 is welded to the upper surface of the plate member 71. The fuel cap fixture 64 is fastened to the female screw portion 80a.

Referring to FIGS. 4 and 5, the fuel receiving member 56 is positioned with respect to the fuel tank 38 by fitting the opening 57a at the center to the outer periphery of the ferrule 50 and fitting the attachment hole 57b to an outer periphery of the fuel cap fastening portion 80.

The fuel cap 55 is disposed on an inner side of the peripheral wall portion 58 of the fuel receiving member 56, and a bottom surface of the annular portion 62 of the frame portion 61 contacts an upper surface of the fuel cap fastening portion 80. The fuel cap 55 is fastened to the fuel cap fastening portion 80 by the fuel cap fixtures 64 inserted into the fixing holes 62b of the annular portion 62 from above.

The bottom surface of the annular portion 62 presses, from above, the portion of the fuel receiving member 56 where the attachment hole 57b is provided, and retains the fuel receiving member 56 with respect to the fuel cap fastening portion 80.

As described above, according to the embodiment to which the present invention is applied, the fuel tank 38 includes the fuel tank main body 70 that stores fuel, and the oil filler port 50a, in which the opening 75 that penetrates the fuel tank main body 70 is provided, the plate member 71 that closes the opening 75 is welded to the fuel tank main body 70, the plate thickness t1 of the plate member 71 is larger than the plate thickness t2 of the fuel tank main body 70, and the oil filler port 50a is provided in the plate member 71.

With this configuration, since the plate member 71 closes the opening 75 by being welded to the opening 75 of the fuel tank main body 70, the plate member 71 having higher strength than the fuel tank main body 70 can be easily provided in the fuel tank 38. Then, the oil filler port is provided in the plate member 71. Thus, the strength of the portion around the oil filler port 50a can be increased with a simple configuration.

Furthermore, the plate thickness t1 of the plate member 71 is larger than the plate thickness t2 of the fuel tank main body 70.

With this configuration, the strength of the plate member 71 can be increased with a simple configuration. Furthermore, since the plate thickness t2 of the fuel tank main body 70 can be reduced, the fuel tank 38 can be reduced in weight.

Furthermore, the plate member 71 is provided to overlap the peripheral edge portion 75a of the opening 75, and the overlapping surface 71b which is a surface of a surface of the plate member 71 on a side overlapping the peripheral edge portion 75a, and the peripheral edge portion 75a are welded by the weld portion 77 along the inner peripheral surface 75b of the peripheral edge portion 75a.

With this configuration, since the peripheral edge portion 75a of the opening 75 is welded to the overlapping surface 71b of the plate member 71 having a large plate thickness, the depth of welding to the plate member 71 can be increased, and welding can be performed favorably.

Furthermore, the plate member 71 overlaps the peripheral edge portion 75a from inside the fuel tank main body 70.

With this configuration, the plate member 71 can be prevented from projecting to the outside of the fuel tank main body 70, the fuel tank 38 can be made compact, and the appearance of the fuel tank 38 is good. Furthermore, the plate member 71 and the fuel tank main body 70 can be welded from the outside of the fuel tank 38, and welding workability is good.

Moreover, the fuel cap fastening portion 80 is provided on the plate member 71, and the fuel cap 55 that openably closes the oil filler port 50a is fastened to the fuel cap fastening portion 80.

With this configuration, since the fuel cap 55 is fastened to the plate member 71 having a large plate thickness via the fuel cap fastening portion 80, the fuel cap 55 can be firmly fixed. Thus, the oil filler port 50a can be favorably closed with the fuel cap 55.

Furthermore, the fuel tank 38 is mounted on the motorcycle 1, the motorcycle 1 includes the side stand 48 that supports the motorcycle 1 in a state of being inclined to one of left and right, the fuel cap 55 that openably closes the oil filler port 50a is provided, the fuel cap 55 includes the cap main body 60 that closes the oil filler port 50a and the frame portion 61 that supports the cap main body 60 in an openable and closable manner, the frame portion 61 includes the annular portion 62 that surrounds the cap main body 60 from the periphery, and the protrusion portion 63 that protrudes downward from the annular portion 62, the protrusion portion 63 includes the recessed portion 63a in which liquid is accumulated, and the discharge port 63b that discharges the liquid is provided on a side surface of a side surface of the recessed portion 63a on a lower side in a state where the motorcycle 1 is supported by the side stand 48.

With this configuration, in a state where the motorcycle 1 is supported by the side stand 48, the liquid accumulated in the recessed portion 63a of the frame portion 61 of the fuel cap 55 can be discharged through the discharge port 63b by the inclination of the motorcycle 1.

Note that the aforementioned embodiment indicates one aspect to which the present invention is applied, and the present invention is not limited to the aforementioned embodiment.

In the aforementioned embodiment, it has been described that the plate member 71 overlaps the peripheral edge portion 75a from inside the fuel tank main body 70, but the present invention is not limited thereto. For example, the plate member 71 may overlap the peripheral edge portion 75a of the opening 75 from outside the fuel tank main body 70 and from above. In this case, the lower surface of the plate member 71, which is the overlapping surface, and the peripheral edge portion 75a of the opening 75 are welded by the weld portion along the inner peripheral surface 75b of the peripheral edge portion 75a.

Furthermore, in the aforementioned embodiment, the configuration in which the discharge port 63b is provided in the recessed portion 63a of the protrusion portion 63 protruding downward from the annular portion 62 of the fuel cap 55 has been described, but the discharge port may be applied to another place. For example, the recessed portion in which the liquid accumulates may be provided in a housing portion capable of housing an article such as a helmet or a small article, and the discharge port for discharging the liquid may be provided on a side surface of a side surface of the recessed portion on a lower side in a state where the motorcycle 1 is supported by the side stand 48. With this configuration, the liquid flowing from the housing portion to the recessed portion can be discharged through the discharge port using the inclination of the motorcycle 1.

Furthermore, in the aforementioned embodiment, the motorcycle 1 has been described as an example, but the present invention is not limited thereto, and the present invention can be applied to a three-wheel saddle-ride vehicle including two front wheels or two rear wheels, and a saddle-ride vehicle including four or more wheels.

REFERENCE SIGNS LIST

1 Motorcycle (saddle-ride vehicle)
38 Fuel tank
48 Side stand
50a Oil filler port
50 Fuel cap
60 Cap main body
61 Frame portion
62 Annular portion
63 Protrusion portion
63a Recessed portion
63b Discharge port
70 Fuel tank main body
71 Plate member
71b Overlapping surface
75 Opening
75a Peripheral edge portion
75b Inner peripheral surface
77 Weld portion
80 Fuel cap fastening portion
t1 Plate thickness (plate thickness of plate member)
t2 Plate thickness (plate thickness of fuel tank main body)

The invention claimed is:

1. A fuel tank comprising: a fuel tank main body that stores fuel; and an oil filler port, wherein:
an opening that penetrates the fuel tank main body is provided,
a plate member that closes the opening is welded to the fuel tank main body,
a strength of the plate member is higher than a strength of the fuel tank main body,
the oil filler port is provided in the plate member,
the oil filler port is provided in a ferrule having a cylindrical shape protruding from the plate member, a fuel receiving member having a tray shape surrounding the ferrule from a periphery is provided on an upper surface of the plate member, the fuel receiving member includes a bottom wall portion disposed around the ferrule, and a peripheral wall portion extending upward from the bottom wall portion,
an upper surface cover that covers the fuel tank main body from above is provided, the upper surface cover includes a cover opening that exposes the fuel receiving member upward, and
a peripheral edge portion of the cover opening is connected to an outer peripheral portion of an upper end of the peripheral edge portion.

2. The fuel tank according to claim 1, wherein a plate thickness of the plate member is larger than a plate thickness of the fuel tank main body.

3. The fuel tank according to claim 2, wherein
the plate member is provided to overlap a peripheral edge portion of the opening in a plate thickness direction, and an inner peripheral surface of the peripheral edge portion is separated radially outward with respect to an outer periphery of the ferrule, and
an overlapping surface, which is a surface of a surface of the plate member on a side overlapping the peripheral edge portion, and the peripheral edge portion are welded by a weld portion formed on the inner peripheral surface along the inner peripheral surface of the peripheral edge portion.

4. The fuel tank according to claim 3, wherein the plate member overlaps the peripheral edge portion from inside the fuel tank main body.

5. The fuel tank according to claim 2, wherein
a fuel cap fastening portion is provided in the plate member, and
a fuel cap that openably closes the oil filler port is fastened to the fuel cap fastening portion.

6. The fuel tank according to claim 2, wherein
the fuel tank is mounted on a saddle-ride vehicle,
the saddle-ride vehicle includes a side stand that supports the saddle-ride vehicle in a state of being inclined to one of left and right,
a fuel cap that openably closes the oil filler port is provided, and the fuel cap includes a cap main body that closes the oil filler port and a frame portion that supports the cap main body in an openable and closable manner,
the frame portion includes an annular portion that surrounds the cap main body from a periphery, and a protrusion portion that protrudes downward from the annular portion, and
the protrusion portion includes a recessed portion in which liquid is accumulated, and is provided with a discharge port that discharges the liquid on a side surface, of side surfaces of the recessed portion, on a lower side in a state where the saddle-ride vehicle is supported by the side stand.

7. The fuel tank according to claim 6, wherein
the liquid discharged through the discharge port passes through the fuel receiving member and is discharged to outside through a drain hole provided inside the fuel receiving member.

8. The fuel tank according to claim 1, wherein
the plate member is provided to overlap a peripheral edge portion of the opening in a plate thickness direction, and an inner peripheral surface of the peripheral edge portion is separated radially outward with respect to an outer periphery of the ferrule, and
an overlapping surface, which is a surface of a surface of the plate member on a side overlapping the peripheral edge portion, and the peripheral edge portion are welded by a weld portion formed on the inner peripheral surface along the inner peripheral surface of the peripheral edge portion.

9. The fuel tank according to claim 8, wherein the plate member overlaps the peripheral edge portion from inside the fuel tank main body.

10. The fuel tank according to claim 9, wherein
a fuel cap fastening portion is provided in the plate member, and a fuel cap that openably closes the oil filler port is fastened to the fuel cap fastening portion.

11. The fuel tank according to claim 9, wherein
the fuel tank is mounted on a saddle-ride vehicle,
the saddle-ride vehicle includes a side stand that supports the saddle-ride vehicle in a state of being inclined to one of left and right,
a fuel cap that openably closes the oil filler port is provided, and the fuel cap includes a cap main body that closes the oil filler port and a frame portion that supports the cap main body in an openable and closable manner,
the frame portion includes an annular portion that surrounds the cap main body from a periphery, and a protrusion portion that protrudes downward from the annular portion, and
the protrusion portion includes a recessed portion in which liquid is accumulated, and is provided with a discharge port that discharges the liquid on a side surface, of side surfaces of the recessed portion, on a lower side in a state where the saddle-ride vehicle is supported by the side stand.

12. The fuel tank according to claim 11, wherein
the liquid discharged through the discharge port passes through the fuel receiving member and is discharged to outside through a drain hole provided inside the fuel receiving member.

13. The fuel tank according to claim 8, wherein
a fuel cap fastening portion is provided in the plate member, and
a fuel cap that openably closes the oil filler port is fastened to the fuel cap fastening portion.

14. The fuel tank according to claim 8, wherein
the fuel tank is mounted on a saddle-ride vehicle,
the saddle-ride vehicle includes a side stand that supports the saddle-ride vehicle in a state of being inclined to one of left and right,
a fuel cap that openably closes the oil filler port is provided, and the fuel cap includes a cap main body that closes the oil filler port and a frame portion that supports the cap main body in an openable and closable manner,
the frame portion includes an annular portion that surrounds the cap main body from a periphery, and a protrusion portion that protrudes downward from the annular portion, and
the protrusion portion includes a recessed portion in which liquid is accumulated, and is provided with a discharge port that discharges the liquid on a side surface, of side surfaces of the recessed portion, on a lower side in a state where the saddle-ride vehicle is supported by the side stand.

15. The fuel tank according to claim 14, wherein
the liquid discharged through the discharge port passes through the fuel receiving member and is discharged to outside through a drain hole provided inside the fuel receiving member.

16. The fuel tank according to claim 1, wherein
a fuel cap fastening portion is provided in the plate member, and
a fuel cap that openably closes the oil filler port is fastened to the fuel cap fastening portion.

17. The fuel tank according to claim 16, wherein
the fuel tank is mounted on a saddle-ride vehicle,
the saddle-ride vehicle includes a side stand that supports the saddle-ride vehicle in a state of being inclined to one of left and right,
a fuel cap that openably closes the oil filler port is provided, and the fuel cap includes a cap main body that closes the oil filler port and a frame portion that supports the cap main body in an openable and closable manner,
the frame portion includes an annular portion that surrounds the cap main body from a periphery, and a protrusion portion that protrudes downward from the annular portion, and
the protrusion portion includes a recessed portion in which liquid is accumulated, and is provided with a discharge port that discharges the liquid on a side surface, of side surfaces of the recessed portion, on a lower side in a state where the saddle-ride vehicle is supported by the side stand.

18. The fuel tank according to claim 17, wherein
the liquid discharged through the discharge port passes through the fuel receiving member and is discharged to outside through a drain hole provided inside the fuel receiving member.

19. The fuel tank according to claim 1, wherein
the fuel tank is mounted on a saddle-ride vehicle,
the saddle-ride vehicle includes a side stand that supports the saddle-ride vehicle in a state of being inclined to one of left and right,
a fuel cap that openably closes the oil filler port is provided, and the fuel cap includes a cap main body that closes the oil filler port and a frame portion that supports the cap main body in an openable and closable manner,
the frame portion includes an annular portion that surrounds the cap main body from a periphery, and a protrusion portion that protrudes downward from the annular portion, and
the protrusion portion includes a recessed portion in which liquid is accumulated, and is provided with a discharge port that discharges the liquid on a side surface, of side surfaces of the recessed portion, on a lower side in a state where the saddle-ride vehicle is supported by the side stand.

20. The fuel tank according to claim 19, wherein
the liquid discharged through the discharge port passes through the fuel receiving member and is discharged to outside through a drain hole provided inside the fuel receiving member.

* * * * *